(12) United States Patent
Higano et al.

(10) Patent No.: US 8,189,148 B2
(45) Date of Patent: May 29, 2012

(54) LIQUID CRYSTAL DISPLAY DEVICE

(75) Inventors: Emi Higano, Ishikawa-gun (JP);
Kazuhiro Nishiyama, Kanazawa (JP);
Mitsutaka Okita, Hakusan (JP);
Shigesumi Araki, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 710 days.

(21) Appl. No.: 12/121,413

(22) Filed: May 15, 2008

(65) Prior Publication Data

US 2008/0291372 A1 Nov. 27, 2008

(30) Foreign Application Priority Data

May 18, 2007 (JP) ................................. 2007-132838

(51) Int. Cl.
*G02F 1/1335* (2006.01)
(52) U.S. Cl. ........... 349/119; 349/98; 349/114; 349/106
(58) Field of Classification Search .................... 349/96, 349/117, 114, 119, 98, 106, 123
See application file for complete search history.

(56) References Cited

U.S. PATENT DOCUMENTS

| 6,977,700 | B2 * | 12/2005 | Uesaka et al. ................. 349/114 |
| 7,695,780 | B2 * | 4/2010 | Ohgaru et al. ................ 428/1.31 |
| 7,728,929 | B2 * | 6/2010 | Wu et al. ........................ 349/114 |
| 2005/0128388 | A1 * | 6/2005 | Joten ............................. 349/114 |
| 2007/0077502 | A1 * | 4/2007 | Moriya ............................ 430/7 |
| 2007/0285403 | A1 | 12/2007 | Aota et al. |
| 2008/0049005 | A1 | 2/2008 | Okita et al. |
| 2008/0049178 | A1 | 2/2008 | Kisara et al. |
| 2008/0074592 | A1 | 3/2008 | Araki et al. |
| 2009/0073352 | A1 * | 3/2009 | Hamilton et al. ............... 349/96 |

FOREIGN PATENT DOCUMENTS

| JP | 2002-207227 | 7/2002 |
| JP | 2005-164957 | 6/2005 |

OTHER PUBLICATIONS

U.S. Appl. No. 12/121,381, filed May 15, 2008, Okita, et al.

* cited by examiner

*Primary Examiner* — Thoi Duong
(74) *Attorney, Agent, or Firm* — Oblon, Spivak, McClelland, Maier & Neustadt, L.L.P.

(57) ABSTRACT

A transflective liquid crystal display device includes a liquid crystal display panel which is configured such that a liquid crystal layer is held between a pair of substrates, and to which an OCB mode is applied, and a pair of optical elements which are disposed on outsides of the liquid crystal layer, and optically compensate a retardation of the liquid crystal layer in a predetermined display state in which a voltage is applied to the liquid crystal layer, wherein the optical element is configured to include a circular polarization element including a polarizer and a first retardation plate which imparts a retardation of ¼ wavelength, and the first retardation plate has such wavelength dispersion characteristics as to establish a relationship, $\alpha 1 < 1$, where $\alpha 1$ is a ratio of an in-plane retardation Re430 at a wavelength of 430 nm to an in-plane retardation Re550 at a wavelength of 550 nm.

3 Claims, 7 Drawing Sheets

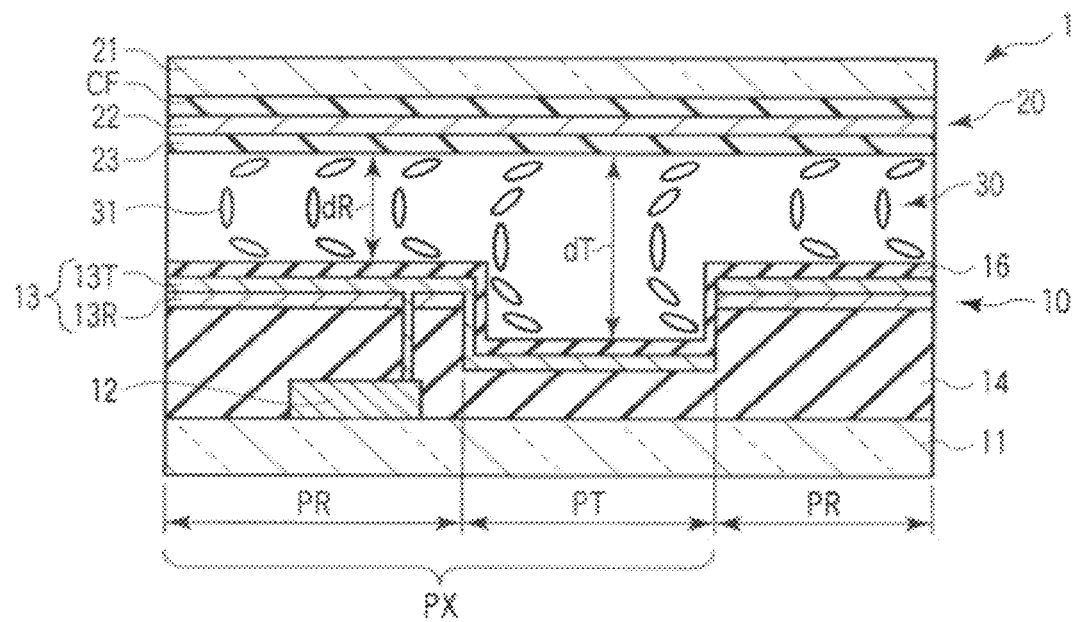
F I G. 3
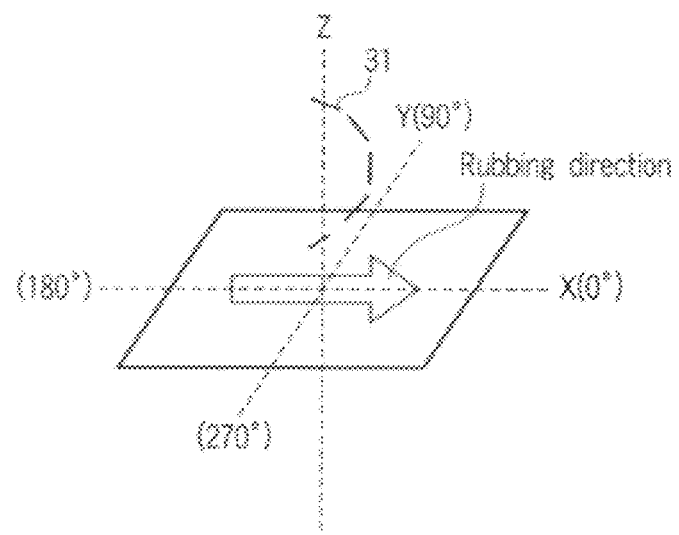
F I G. 4

LIQUID CRYSTAL DISPLAY DEVICE

CROSS-REFERENCE TO RELATED APPLICATIONS

This application is based upon and claims the benefit of priority from prior Japanese Patent Application No. 2007-132838, filed May 18, 2007, the entire contents of which are incorporated herein by reference.

BACKGROUND OF THE INVENTION

1. Field of the Invention

The present invention relates generally to a liquid crystal display device, and more particularly to a transflective liquid crystal display device using an optically compensated bend (OCB) alignment technique which can realize an increase in viewing angle and an increase in response speed.

2. Description of the Related Art

Liquid crystal display devices have been applied to various fields by taking advantage of their features such as light weight, small thickness and low power consumption.

In recent years, attention has been paid to a liquid crystal display, to which the OCB mode is applied, as a liquid crystal display device which can improve the viewing angle and response speed. The OCB mode liquid crystal display device is configured such that a liquid crystal layer including liquid crystal molecules, which are bend-aligned in a state in which a predetermined voltage is applied, is held between a pair of substrates. Compared to a twisted nematic (TN) mode, the OCB mode is advantageous in that the response speed can be increased and the viewing angle can be increased since the effect of birefringence of light, which passes through the liquid crystal layer, can optically be compensated by the alignment state of liquid crystal molecules.

In addition, in recent years, a transflective liquid crystal display device having a reflective part and a transmissive part has been developed. Jpn. Pat. Appln. KOKAI Publication No. 2005-164957, for instance, discloses a circular polarizer which is applicable to an OCB mode transflective liquid crystal display device. This circular polarizer is configured to include a polarizer and a liquid crystal film as an optical anisotropic element in which a nematic hybrid alignment structure is fixed.

At present, however, in the transparent liquid crystal display device to which the OCB mode is applied, for example, with respect to a blue pixel of 430 nm, black voltages do not agree in reflective display and transmissive display, and a black voltage in transmissive display is higher than a black voltage in reflective display. At this time, if the black voltage in transmissive display is commonly applied, as an optimal black voltage, to the transmissive part and reflective part of the pixel, the reflectance in the reflective part does not become zero, and owing to this effect, gray level inversion is visually recognized when the liquid crystal display device is observed in a frontal direction.

Similarly, with respect to the long wavelength side, for example, with respect to a red pixel of 625 nm, black voltages do not agree in reflective display and transmissive display, and a black voltage in transmissive display is lower than a black voltage in reflective display. At this time, if the black voltage in transmissive display is commonly applied, as an optimal black voltage, to the transmissive part and reflective part of the pixel, the reflectance in the reflective part does not become zero, and a gray level value corresponding to black cannot be obtained. Thus, perfect black display cannot be effected when the liquid crystal display device is observed in a frontal direction.

BRIEF SUMMARY OF THE INVENTION

The object of the present invention is to provide a transflective liquid crystal display device with good display quality, to which an OCB mode is applied.

According to an aspect of the present invention, there is provided a liquid crystal display device having a reflective part and a transmissive part in each of a plurality of pixels which are arrayed in a matrix, comprising: a liquid crystal display panel which is configured such that a liquid crystal layer is held between a pair of substrates, and to which an OCB mode is applied; and a pair of optical elements which are disposed on outsides of the liquid crystal layer, and optically compensate a retardation of the liquid crystal layer in a predetermined display state in which a voltage is applied to the liquid crystal layer, wherein the optical element is configured to include a circular polarization element including a polarizer and a first retardation plate which is disposed between the polarizer and the liquid crystal layer and imparts a retardation of ¼ wavelength, and the first retardation plate has such wavelength dispersion characteristics as to establish a relationship, $\alpha 1 < 1$, where $\alpha 1$ is a ratio of an in-plane retardation Re430 at a wavelength of 430 nm to an in-plane retardation Re550 at a wavelength of 550 nm.

The present invention can provide a transflective liquid crystal display device with good display quality, to which an OCB mode is applied.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view that schematically shows the structure of an OCB mode transflective liquid crystal display panel which is applicable to the liquid crystal display device shown in FIG. 1;

FIG. 4 is a view for explaining the definitions of axis angles to a rubbing direction of an alignment film in the liquid crystal display device shown in FIG. 1;

DETAILED DESCRIPTION OF THE INVENTION

A liquid crystal display device according to an embodiment of the invention will now be described with reference to the accompanying drawings. A description is given of, as an example of the liquid crystal display device, a transflective liquid crystal display device to which an OCB mode is applied and which is configured to include, in each of pixels, a transmissive part that displays an image by selectively transmitting the light from the backlight and a reflective display part that displays an image by selectively reflecting ambient light.

Figure 1:
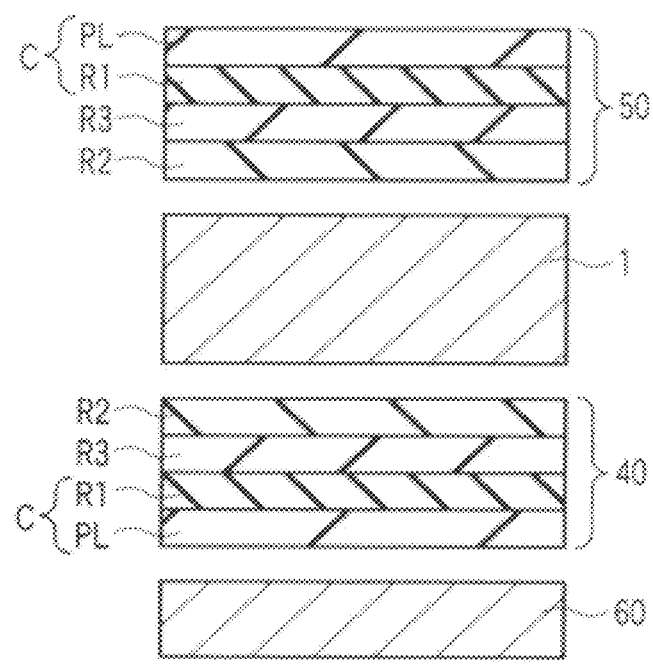
FIG. 1 is a view that schematically shows the structure of a liquid crystal display device according to a first embodiment of the present invention.

As shown in FIG. 1, the liquid crystal display device is configured to include a liquid crystal display panel 1 to which an OCB mode is applied, and a pair of optical elements, namely, a first optical element 40 and a second optical element 50, which are disposed both outer surfaces of the liquid crystal display panel 1. The liquid crystal display includes a backlight 60 that illuminates the liquid crystal display panel 1 from the first optical element 40 side. Specifically, the first optical element 40 is disposed between the liquid crystal display panel 1 and the backlight 60.

Figure 2:
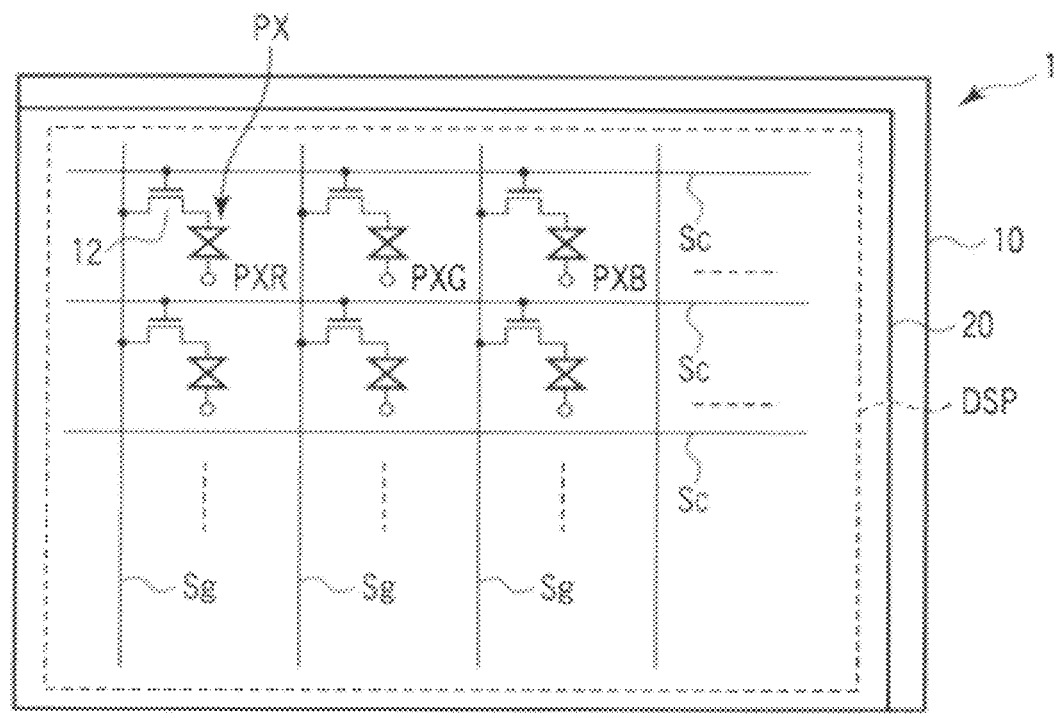
FIG. 2 is a view that schematically shows the structure of a liquid crystal display panel which is applicable to the liquid crystal display device shown in FIG. 1.

As shown in FIG. 2 and FIG. 3, the liquid crystal display panel 1 is configured such that a liquid crystal layer 30 is held between a pair of substrates, namely, an array substrate (a substrate opposed to the first optical element 40) 10 and a counter-substrate (a substrate opposed to the second optical element 50, or an observation-side substrate) 20, and the liquid crystal display panel 1 includes an active area DSP that displays an image. The active area DSP has a substantially rectangular shape and is composed of a plurality of pixels PX which are arrayed in a matrix.

Each of the pixels PX includes a reflective part PR that displays an image by selectively reflecting ambient light in a reflective display mode, and a transmissive part PT that displays an image by selectively transmitting the light from the backlight 60 in a transmissive display mode.

The array substrate 10 is formed by using a light-transmissive insulating substrate 11 of, e.g. glass. The array substrate 10 includes, on one major surface of the insulating substrate 11, that is, on a surface thereof facing the liquid crystal layer 30, a plurality of scanning lines Sc which are disposed in a manner to extend along a row direction of the pixels PX; a plurality of signal lines Sg which are disposed in a manner to extend along a column direction of the pixels PX; switch elements 12 are disposed in association with the respective pixels PX near intersections between the scanning lines Sc and signals lines Sg; pixel electrodes 13 which are connected to the switch elements 12 and are disposed in association with the respective pixels PX; and an alignment film 16 which is disposed in a manner to cover the pixel electrodes 13.

The scanning lines Sc and signal lines Sg are disposed so as to cross each other via an insulation film.

The switch element 12 is composed of, e.g. a thin-film transistor (TFT). The switch element 12 includes a semiconductor layer which is formed of, e.g. polysilicon or amorphous silicon. The gate of the switch element 12 is electrically connected to the associated scanning line Sc (or formed integral with the associated scanning line). The source of the switch element 12 is electrically connected to the associated signal line Sg (or formed integral with the associated signal line).

The pixel electrode 13 is disposed on an insulation film 14. The insulation film 14 forms a gap difference of the liquid crystal layer 3 between the reflective part PR and the transmissive part PT. Each of the pixel electrodes 13 includes a reflective electrode 13R which is provided in association with the reflective part PR, and a transmissive electrode 13T which is provided in association with the transmissive part PT. The reflective electrode 13R is formed of a light-reflective electrically conductive material such as aluminum. The transmissive electrode 13T is formed of a light-transmissive electrically conductive material such as indium tin oxide (ITO). The reflective electrode 13R and transmissive electrode 13T are electrically connected to the drain of the switch element 12.

The counter-substrate 20 is formed by using a light-transmissive insulating substrate 21 of, e.g. glass. The counter-substrate 20 includes a counter-electrode 22 which is disposed on one major surface of the insulating substrate 21, that is, a surface thereof facing the liquid crystal layer 30, so as to be opposed to the pixel electrodes 13 of the plural pixels PX, and an alignment film 23 which is disposed so as to cover the counter-electrode 22. The counter-electrode 22 is formed of a light-transmissive electrically conductive material such as ITO.

In a color-display-type liquid crystal display device, the liquid crystal display panel 1 includes, in the active area DSP, a plurality of kinds of pixels, for instance, a red pixel PXR which displays red (R), a green pixel PXG which displays green (G) and a blue pixel PXB which displays blue (B).

In the example shown in FIG. 3, the counter-substrate 20 includes, in the active area DSP, a color filter layer CF which is disposed in association with each of the pixels PX on one of major surfaces of the insulating substrate 21. The color filter layer CF is formed of a plurality of color resins, which are colored in red (R), green (G) and blue (B).

Specifically, on the insulating substrate 21, the counter-substrate 20 includes, as the color filter layer CF, a color resin which is so colored as to pass light with a principal wavelength of red in association with the red pixel PXR, a color resin which is so colored as to pass light with a principal wavelength of green in association with the green pixel PXG, and a color resin which is so colored as to pass light with a principal wavelength of blue in association with the blue pixel PXB. The color filter layer CF may be provided on the array substrate side.

The array substrate 10 and counter-substrate 20 having the above-described structures are disposed with a predetermined gap therebetween via a spacer not shown (e.g. a columnar spacer which is integrally formed on one of the substrates) in such a manner that their alignment films 16 and 23 are opposed to each other, and are attached to each other by a sealant. The liquid crystal layer 30 is sealed in the gap between the array substrate 10 and counter-substrate 20.

In this embodiment, the liquid crystal display panel 1 is configured such that an OCB mode is applied to the liquid crystal display panel 1. The liquid crystal layer 30 is formed of a liquid crystal material including liquid crystal molecules 31 which have positive dielectric constant anisotropy and optically positive uniaxiality. In this liquid crystal layer 30, in a predetermined display state in which a voltage is applied to the liquid crystal layer 30, the liquid crystal molecules 31 are bend-aligned between the array substrate 10 and counter-substrate 20. In the example shown in FIG. 3, the liquid crystal molecules 31 are bend-aligned in the transmissive part PT and reflective part PR.

In particular, in the liquid crystal display panel 1 to which the OCB mode is applied, a cell gap dR in the reflective part PR is set to be less than ½ of a cell gap dT of the transmissive part PT. The cell gap, in this context, substantially corresponds to the thickness of the liquid crystal layer 30 between the alignment film 16 of the array substrate 10 and the alignment film 23 of the counter-substrate 20. In the present embodiment, the cell gap dT of the transmissive part PT is 4.65 μm, and the cell gap dR of the reflective part PR is 2.0 μm.

First Embodiment

To begin with, a liquid crystal display device according to a first embodiment is described. In the first embodiment, the first optical element 40 and second optical element 50 have a function of optically compensating the retardation of the liquid crystal layer 30 in a predetermined display state in which a voltage is applied to the liquid crystal layer 30 in the above-described liquid crystal display panel 1.

As shown in FIG. 1, the first optical element 40 is disposed on the outer surface of the array substrate 10, and the second optical element 50 is disposed on the outer surface of the counter-substrate 20. The first optical element 40 and second optical element 50 have the same structure. Specifically, each of the first optical element 40 and second optical element 50 is configured to include a circular polarization element C including a polarizer PL and a first retardation plate R1; a second retardation plate R2; and a third retardation plate R3. The first optical element 40 and second optical element 50 are configured to be symmetric with respect to the liquid crystal display panel 1. Specifically, in each of the first optical element 40 and second optical element 50, the second retardation plate R2, third retardation plate R3, first retardation plate R1 and polarizer PL are stacked in the named order from the liquid crystal display panel 1 side.

The polarizer PL is configured such that a polarizing layer, which is formed of, e.g. polyvinyl alcohol (PVA), is held between a pair of support layers which are formed of, e.g. triacetylcellulose (TAC). The polarizer PL has, in its plane, a transmission axis and an absorption axis which are substantially perpendicular to each other.

The first retardation plate R1 is disposed between the polarizer PL and the liquid crystal display panel 1, and has, in its plane, a fast axis and a slow axis which are substantially perpendicular to each other. The first retardation plate R1 is a so-called ¼ wavelength plate which imparts a retardation of ¼ wavelength between light components of a predetermined wavelength (e.g. light having a wavelength of 550 nm) which pass through the fast axis and the slow axis. The combination of the polarizer PL and the first retardation plate (¼ wavelength plate) R1 ideally functions as a circular polarizer which converts linearly polarized light of a predetermined wavelength, which has passed through the transmission axis of the polarizer PL, to circularly polarized light.

The second retardation plate R2 is disposed between the circular polarization element C and the liquid crystal display panel 1, and has a fast axis and a slow axis which are substantially perpendicular to each other. The second retardation plate R2 is a retardation plate corresponding to an A-plate, which has a retardation in its plane. Specifically, the second retardation plate R2 has a refractive index anisotropy of $nx>ny=nz$ (optically positive) or $nz=nx>ny$ (optically negative), where nx and ny are refractive indices in mutually perpendicular directions in its plane, and nz is a refractive index in its normal direction. A liquid crystal film, in which discotic liquid crystal molecules are fixed in the state in which the discotic liquid crystal molecules are hybrid-aligned (i.e. the major axis is hybrid-aligned) along the normal direction (i.e. the thickness direction of the retardation plate) in the liquid crystal state, is applicable as the second retardation plate R2. For example, a WV (wide view) film (manufactured by FUJIFILM Corporation) is applicable.

The third retardation plate R3 is disposed between the circular polarization element C and the second retardation plate R2, and is a retardation plate corresponding to a C-plate having retardation in its thickness direction. Specifically, the third retardation plate R3 has a refractive index anisotropy of $nx=ny<nz$ (optically positive) or $nx=ny>nz$ (optically negative), where nx and ny are refractive indices in mutually perpendicular directions in its plane, and nz is a refractive index in its normal direction.

In the above-described liquid crystal display device, the respective structural parts are disposed, for example, with the following axis angles, with the rubbing direction of the alignment film 16 of the array substrate 10 and the alignment film 23 of the counter-substrate 20 being set as a reference direction. The axis angles are angles of the absorption axis of the polarizer and the slow axis of the retardation plate, which are formed counterclockwise relative to the reference direction (X axis), and are defined as shown in FIG. 4. Specifically, when the liquid crystal display device is observed from the counter-substrate 20 side, an X axis and a Y axis, which are perpendicular to each other, are defined, for the purpose of convenience, in a plane that is parallel to the major surface of the array substrate 10 (or counter-substrate 20), and a normal direction to this plane is defined as a Z axis. The term "in a plane" means "in an X-Y plane" which is defined by the X axis and Y axis. The rubbing direction of the alignment film 16 and alignment film 23 is parallel to the X axis, and the liquid crystal molecules 31 of the liquid crystal layer 30 are bend-aligned in the X-Z plane.

Specifically, in the liquid crystal panel 1, the rubbing direction of the liquid crystal layer 30 is set at 0° azimuth. In each pixel PX, the cell gap dT of the transmissive part PT is set at 4.65 μm, and the cell gap dR of the reflective part PR is set at 2.0 μm. A pre-tilt angle Θp of the liquid crystal molecules in the liquid crystal layer 30 is set at 7°.

In the array substrate-side first optical element 40, the polarizer PL is disposed such that its absorption axis is set at 45° azimuth. The first retardation plate R1 is disposed such that its slow axis is set at 0° azimuth. The second retardation plate R2 is disposed such that its slow axis is set at 90° azimuth.

In the counter-substrate-side second optical element 50, the polarizer PL is disposed such that its absorption axis is set at 135° azimuth. The first retardation plate R1 is disposed such that its slow axis is set at 90° azimuth. The second retardation plate R2 is disposed such that its slow axis is set at 90° azimuth.

As described above, in the first embodiment, in particular, the slow axis of the first retardation plate R1 of the first optical element 40 is set at 0° to the rubbing direction, and the slow axis of the first retardation plate R1 of the second optical element 50 is set at 90° to the rubbing direction, and thus both slow axes are disposed to be perpendicular to each other. Thereby, the effect of wavelength dispersion of the first retardation plate R1 itself can be relaxed. In particular, it becomes possible to suppress a decrease in contrast due to the wavelength dependency when the liquid crystal display device is observed from the front (the normal direction of the liquid crystal display panel 1).

In addition, each of the polarizers PL, which are included in the first optical element 40 and second optical element 50, is disposed such that the absorption axis thereof is set at 45° to the slow axis of the first retardation plate R1 that constitutes the circular polarization element C, and that the absorption axes of both polarizers PL are perpendicular to each other.

The retardation values of the respective structural parts of the first optical element 40 and second optical element 50 are as follows. In this case, the retardation values at the wavelength of 550 nm are indicated. Specifically, the retardation R of the first retardation plate R1 is 137.5 nm, the retardation (in-plane retardation) Re of the second retardation plate R2 is 45 nm, and the retardation (retardation in thickness direction) Rth of the third retardation plate R3 is 145 nm. In this case, the retardation values are set to be equal between the first optical element 40 and the second optical element 50 which are disposed via the liquid crystal layer 30, but in the present invention these retardation values may not be equal.

A comparative example is now considered, wherein a retardation plate having such wavelength dispersion characteristics as to have a greater retardation (phase difference) in the short wavelength side than in the long wavelength side is applied as the first retardation plate R1 that constitutes the circular polarization element C. Specifically, the first retardation plate R1 that is applied in this comparative example has wavelength dispersion characteristics as indicated by a solid line B in FIG. 5. The term "normalized retardation" in this specification means a normalized retardation R/R (λ=550) at each wavelength in a case where normalization is performed by a retardation R (λ=550) at the wavelength of 550 nm. Specifically, in the first retardation plate R1, the normalized retardation R/R (λ=550) is set to be greater than 1 on the short wavelength side, and to be less than 1 on the long wavelength side. To be more specific, when the ratio of a retardation R430 at the wavelength of 430 nm to a retardation R550 at the wavelength of 550 nm is α1, the ratio α1 is set to be α1>1.

When the ratio of a retardation R625 at the wavelength of 625 nm to a retardation R550 at the wavelength of 550 nm is α2, the ratio α2 is set to be α2<1.

Figure 6A:
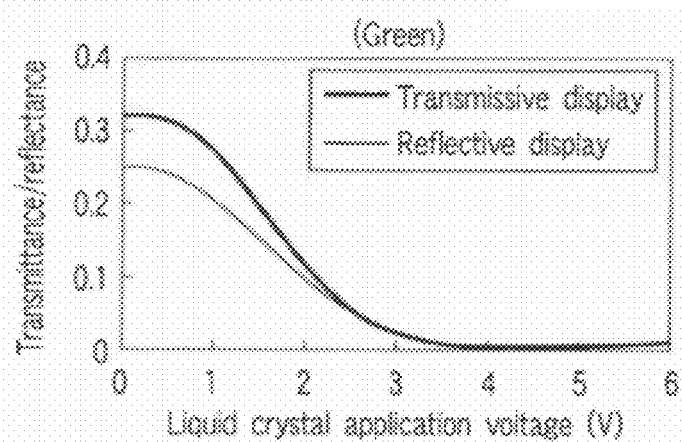
FIG. 6A is a graph showing an example of R-V characteristics and T-V characteristics in a green pixel in a comparative example.

Assume now that optical design is made so as to optimize the retardation at the wavelength of, e.g. 550 nm, with use of the above-described circular polarization element C. Thereby, as regards the green pixel of the wavelength of 550 nm, as indicated by R (reflectance)-V (application voltage) characteristics in reflective display and T (transmittance)-V (application voltage) characteristics in transmissive display which are shown in FIG. 6A, the black voltage in reflective display (the application voltage to the liquid crystal layer of the reflective part at the time when the reflectance becomes zero) agrees with the black voltage in transmissive display (the application voltage to the liquid crystal layer of the transmissive part at the time when the transmittance becomes zero).

Figure 6B:
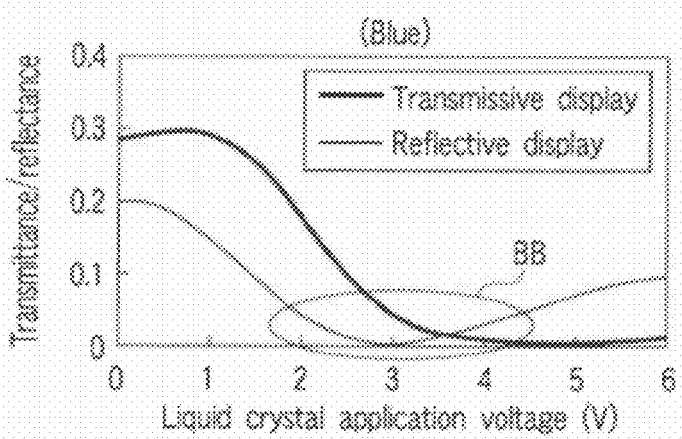
FIG. 6B is a graph showing an example of R-V characteristics and T-V characteristics in a blue pixel in the comparative example.

On the other hand, as regards the short wavelength side, for example, as regards the blue pixel of the wavelength of 430 nm, as shown in FIG. 6B, the black voltage in reflective display does not agree with the black voltage in transmissive display, and the black voltage in transmissive display is higher than the black voltage in reflective display. At this time, as indicated by BB in the Figure, if the black voltage in transmissive display is commonly applied as an optimal black voltage to the transmissive part and reflective part of the pixel, the reflectance in the reflective part does not become zero, but becomes the same reflectance as a gray level value that is different from the gray level value corresponding to black. Thus, when the liquid crystal display device is observed in the frontal direction, a gray level inversion is visually recognized.

Figure 6C:
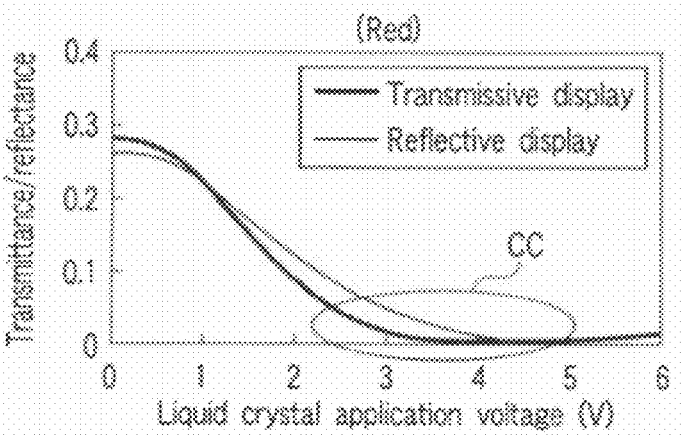
FIG. 6C is a graph showing an example of R-V characteristics and T-V characteristics in a red pixel in the comparative example.

As regards the long wavelength side, for example, as regards the red pixel of the wavelength of 625 nm, as shown in FIG. 6C, the black voltage in reflective display does not agree with the black voltage in transmissive display, and the black voltage in transmissive display is lower than the black voltage in reflective display. At this time, as indicated by CC in the Figure, even if the black voltage in transmissive display is commonly applied as an optimal black voltage to the transmissive part and reflective part of the pixel, the reflectance in the reflective part does not become zero, and a gray level value corresponding to black cannot be obtained. Thus, when the liquid crystal display device is observed in the frontal direction, imperfect black display is effected.

Thus, in the first embodiment, a retardation plate having such wavelength dispersion characteristics as to have a less retardation in the short wavelength side than in the long wavelength side is applied as the first retardation plate R1 that constitutes the circular polarization element C. Specifically, the first retardation plate R1 that is applied in the first embodiment has wavelength dispersion characteristics as indicated by a solid line A in FIG. 5. Specifically, in the first retardation plate R1, the normalized retardation R/R (λ=550) is set to be less than 1 on the short wavelength side. To be more specific, when the ratio of a retardation R430 at the wavelength of 430 nm to a retardation R550 at the wavelength of 550 nm is α1, the ratio α1 is set to be α1<1.

In addition, in the first retardation plate R1, it is preferable that the normalized retardation R/R (λ=550) be set to be greater than 1 on the long wavelength side. Specifically, when the ratio of a retardation R625 at the wavelength of 625 nm to a retardation R550 at the wavelength of 550 nm is α2, the ratio α2 should preferably be set at α2>1.

Figure 7A:
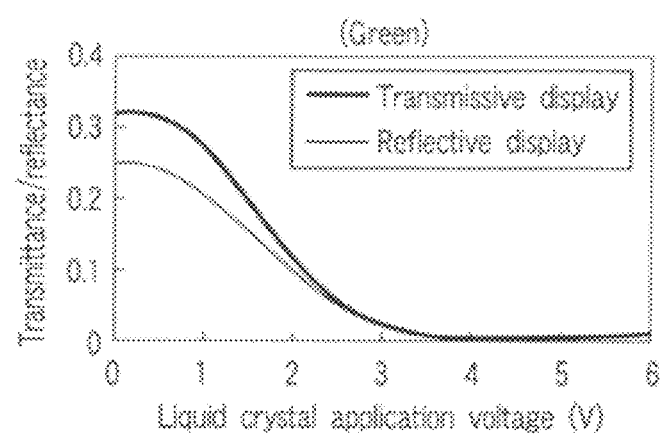
FIG. 7A is a graph showing an example of R-V characteristics and T-V characteristics in a green pixel in the first embodiment.

In the case where optical design is made so as to optimize the retardation at the wavelength of, e.g. 550 nm, with use of the above-described circular polarization element C, as regards the green pixel of the wavelength of 550 nm, as indicated by R-V characteristics in reflective display and T-V characteristics in transmissive display which are shown in FIG. 7A, the black voltage in reflective display agrees with the black voltage in transmissive display. In this example, the black voltage was 4.0V.

Figure 7B:
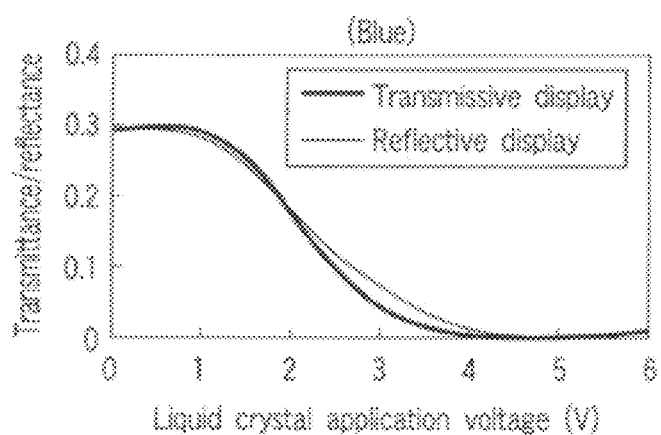
FIG. 7B is a graph showing an example of R-V characteristics and T-V characteristics in a blue pixel in the first embodiment.

As regards the short wavelength side, for example, as regards the blue pixel of the wavelength of 430 nm, as shown in FIG. 7B, the black voltage in reflective display agrees with the black voltage in transmissive display, and in this example the black voltage was 4.8V. In this manner, by applying the first retardation plate R1 in which the ratio α1 is set at α1<1, black display without occurrence of gray level inversion can be realized.

Figure 7C:
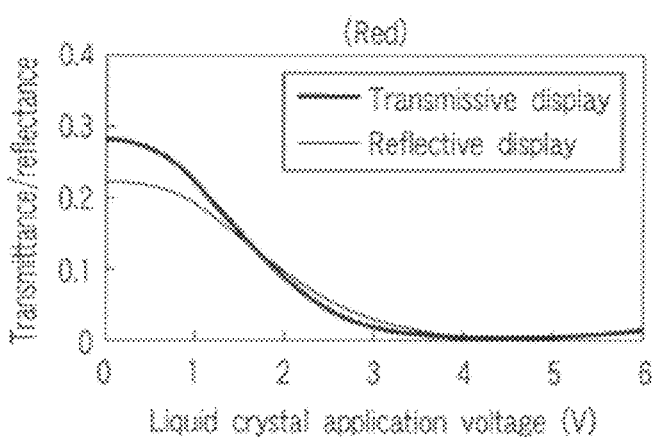
FIG. 7C is a graph showing an example of R-V characteristics and T-V characteristics in a red pixel in the first embodiment.

Similarly, as regards the long wavelength side, for example, as regards the red pixel of the wavelength of 625 nm, as shown in FIG. 7C, the black voltage in reflective display agrees with the black voltage in transmissive display, and in this example the black voltage was 4.2V. In this manner, by applying the first retardation plate R1 in which the ratio α2 is set at α2>1, perfect black display can be realized.

As described above, in each of the color pixels, no gray level inversion was visually recognized, perfect black display was visually recognized, and good display quality was obtained.

Second Embodiment

Next, a liquid crystal display device according to a second embodiment is described. In the second embodiment, like the first embodiment, the first optical element 40 and second optical element 50 have a function of optically compensating the retardation of the liquid crystal layer 30 in a predetermined display state in which a voltage is applied to the liquid crystal layer 30 in the above-described liquid crystal display panel 1. In particular, in the second embodiment, the circular polarization element C, which is included in each of the first optical element 40 and second optical element 50, includes a first retardation plate R1 in which a plurality of retardation layers are stacked.

Figure 8:
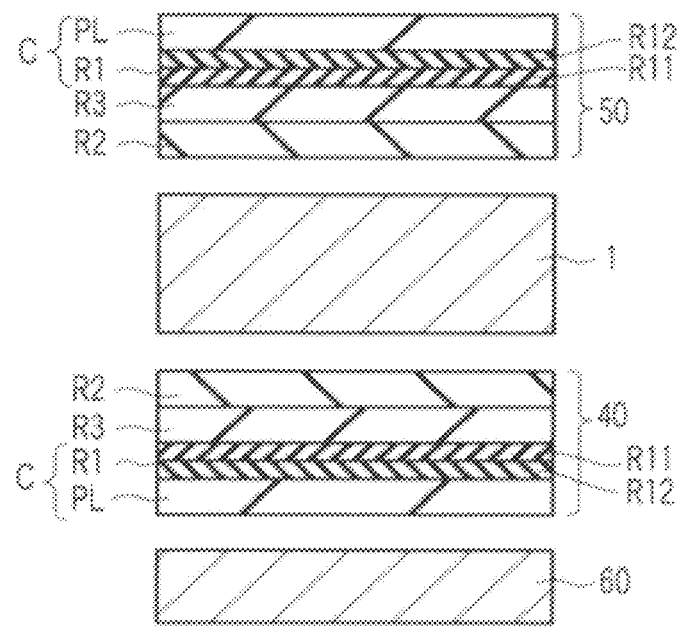
FIG. 8 is a view that schematically shows the structure of a liquid crystal display device according to a second embodiment of the present invention.

Specifically, as shown in FIG. 8, the circular polarization element C of each of the first optical element 40 and second optical element 50 includes a first retardation plate R1 in which a first retardation layer R11 and a second retardation layer R12 are stacked. The other structure is the same as in the first embodiment.

The first retardation layer R11 is disposed such that its slow axis is set at 90° azimuth. The retardation of the first retardation layer R11 is 437 nm at the wavelength of 550 nm. The second retardation layer R12 is disposed such that its slow axis is set at 0° azimuth. The retardation of the second retardation layer R12 is 299.5 nm at the wavelength of 550 nm. The other structural dispositions and retardation values are the same as those in the first embodiment.

Figure 5:
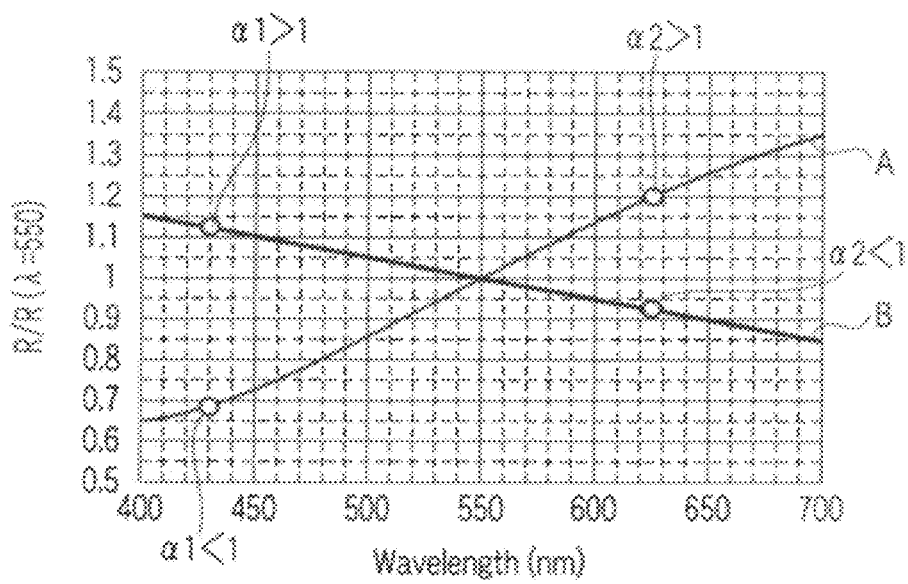
FIG. 5 is a graph for explaining wavelength dispersion characteristics of a first retardation plate which is applicable to the present embodiment.

In the second embodiment, each of the first retardation layer R11 and second retardation layer R12, which constitute the first retardation plate R1 of the circular polarization element C, has wavelength dispersion characteristics as indicated by the solid line B in FIG. 5 (i.e. such wavelength dispersion characteristics as to have a greater retardation in the short wavelength side than in the long wavelength side). Specifically, in these retardation layers, the normalized retardation R/R (λ=550) is set to be greater than 1 on the short wavelength side. To be more specific, when the ratio of a retardation R430 at the wavelength of 430 nm to a retardation R550 at the wavelength of 550 nm is α1, the ratio α1 is set to be α1>1.

Figure 10:
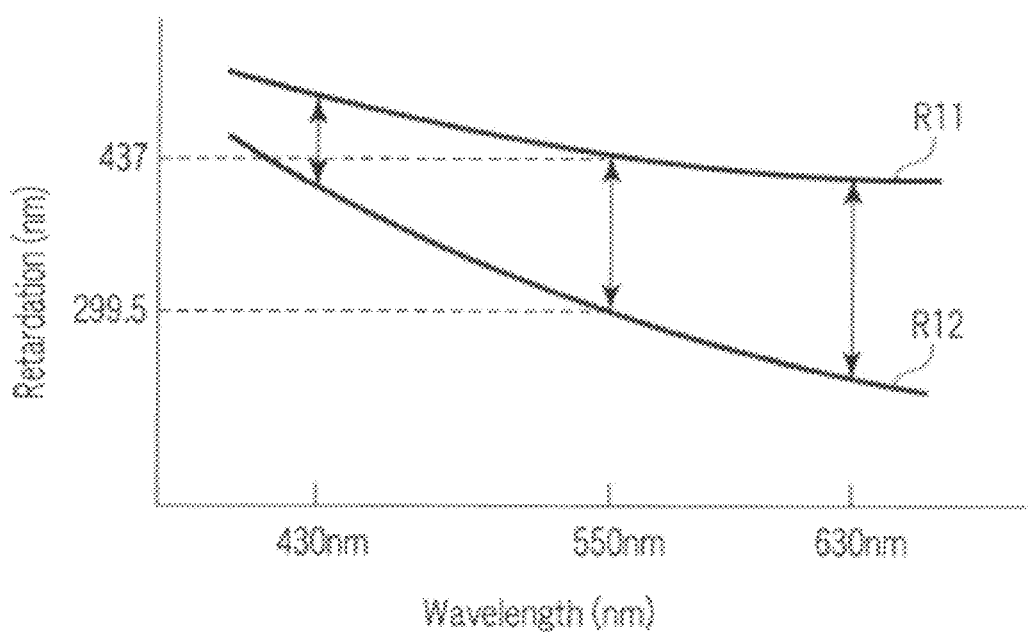
FIG. 10 is a graph showing an example of wavelength dispersion characteristics of a first retardation layer (R11) and a second retardation layer (R12) which are applied to the second embodiment.
Figure 11:
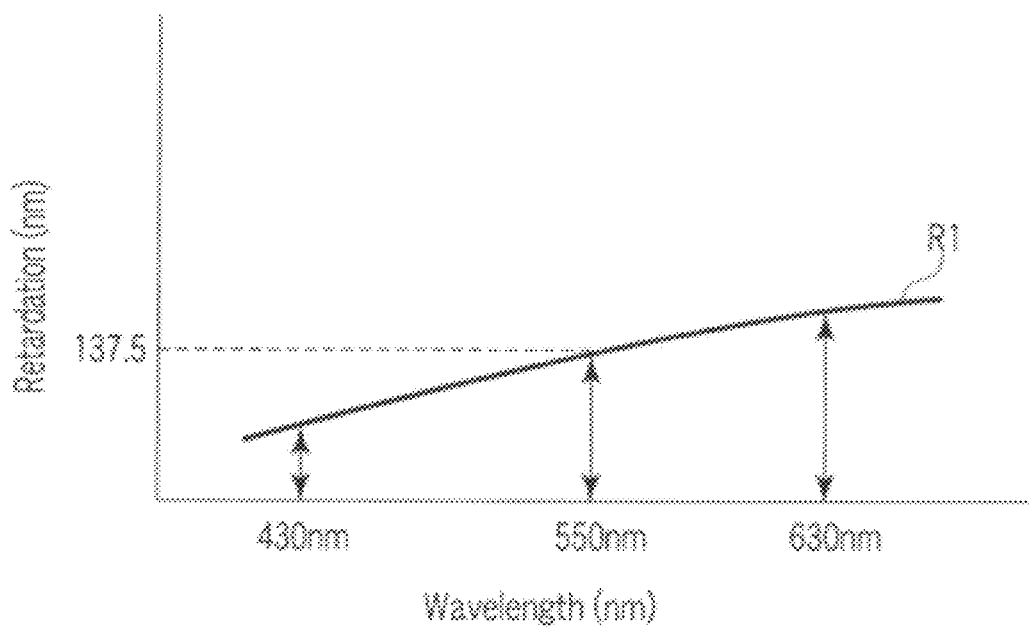
FIG. 11 is a graph showing an example of wavelength dispersion characteristics of a first retardation plate (R1) which is composed of the first retardation layer and the second retardation layer shown in FIG. 10.

As is shown in FIG. 10, the first retardation layer R11 and second retardation layer R12 have different retardations (nm) at respective wavelengths. In this example, the slow axes of the first retardation layer R11 and second retardation layer R12 are disposed to be perpendicular to each other. Thus, the total retardation of the first retardation plate R1 corresponds to a difference between the retardation of the first retardation layer R11 and the retardation of the second retardation layer R12 at each wavelength. This difference is greater in the long wavelength side than in the short wavelength side, as shown in FIG. 10. As a result, as shown in FIG. 11, the first retardation plate R1 has such wavelength dispersion characteristics as to have a less retardation in the short wavelength side than in the long wavelength side.

In addition, in the first retardation layer R11 and second retardation layer R12 of the first retardation plate R1, it is preferable that the normalized retardation R/R (λ=550) be set at less than 1 on the long wavelength side. Specifically, when the ratio of a retardation R625 at the wavelength of 625 nm to a retardation R550 at the wavelength of 550 nm is α2, the ratio α2 should preferably be set at α2<1.

Figure 9A:
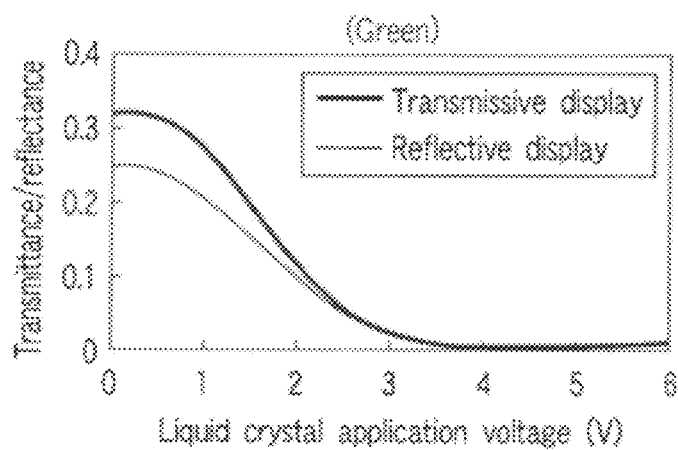
FIG. 9A is a graph showing an example of R-V characteristics and T-V characteristics in a green pixel in the second embodiment.

In the case where optical design is made so as to optimize the retardation at the wavelength of, e.g. 550 nm, with use of the above-described circular polarization element C, as regards the green pixel of the wavelength of 550 nm, as indicated by R-V characteristics in reflective display and T-V characteristics in transmissive display which are shown in FIG. 9A, the black voltage in reflective display agrees with the black voltage in transmissive display. In this example, the black voltage was 4.0V.

Figure 9B:
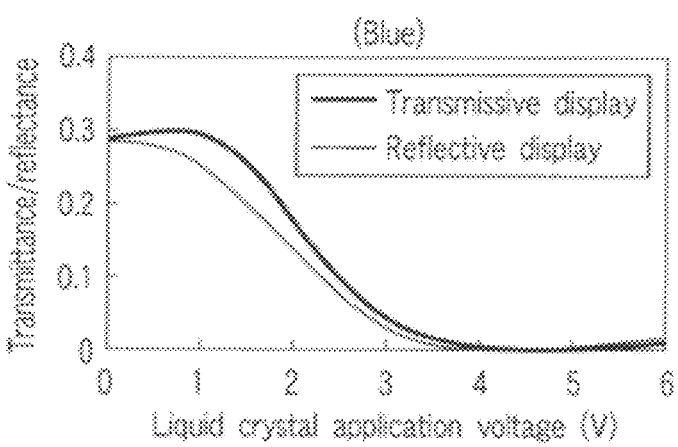
FIG. 9B is a graph showing an example of R-V characteristics and T-V characteristics in a blue pixel in the second embodiment.
Figure 9C:
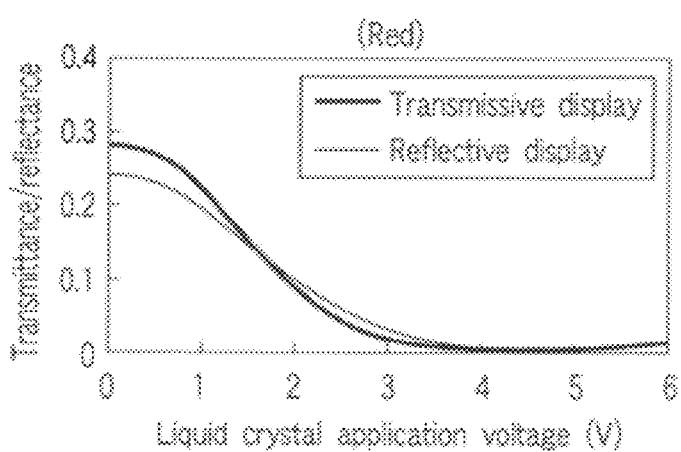
FIG. 9C is a graph showing an example of R-V characteristics and T-V characteristics in a red pixel in the second embodiment.

As regards the short wavelength side, for example, as regards the blue pixel of the wavelength of 430 nm, as shown in FIG. 9B, the black voltage in reflective display agrees with the black voltage in transmissive display, and in this example the black voltage was 4.5V. Similarly, as regards the long wavelength side, for example, as regards the red pixel of the wavelength of 625 nm, as shown in FIG. 9C, the black voltage in reflective display agrees with the black voltage in transmissive display, and in this example the black voltage was 4.2V.

As described above, in each of the color pixels, no gray level inversion was visually recognized, perfect black display was visually recognized, and good display quality was obtained.

The present invention is not limited directly to the above-described embodiments. In practice, the structural elements can be modified and embodied without departing from the spirit of the invention. Specifically, the method of realizing inverse wavelength dispersion characteristics in the first retardation plate R1 may be implemented by the single-layer first retardation plate R1, or by a multiplayer structure of a plurality of retardation plates. Various inventions can be made by properly combining the structural elements disclosed in the embodiments. For example, some structural elements may be omitted from all the structural elements disclosed in the embodiments. Furthermore, structural elements in different embodiments may properly be combined.

For example, it should suffice if the above-described optical elements 40 and 50 are disposed on the outside of the liquid crystal layer 30. Specifically, in the case where the optical element 40 is disposed on the array substrate 10 side, the structure is not limited to the above-described embodiments, and at least one of the first retardation plate R1, third retardation plate R3 and second retardation plate R2, which constitute the optical element 40, may be disposed between the insulating substrate 11, which constitutes the array substrate 10, and the liquid crystal layer 30. Similarly, in the case where the optical element 50 is disposed on the counter-substrate 20 side, at least one of the first retardation plate R1, third retardation plate R3 and second retardation plate R2, which constitute the optical element 50, may be disposed between the insulating substrate 21, which constitutes the counter-substrate 20, and the liquid crystal layer 30.

What is claimed is:

1. A liquid crystal display device having a reflective part and a transmissive part in each of a plurality of red, green, and blue pixels which are arrayed in a matrix, comprising:
a liquid crystal display panel which is configured such that a liquid crystal layer is held between an array substrate and a counter substrate, and to which an OCB mode is applied, the array substrate having pixel electrodes and a first alignment film covering the pixel electrodes, the counter substrate having red color layer opposed to the array substrate corresponding to the red pixels, green color layer opposed to the array substrate corresponding to the green pixels, blue color layer opposed to the array substrate corresponding to the blue pixels, a counter electrode and a second alignment film covering the counter electrode;
a first optical element disposed outside of the array substrate and including a first circular polarization element including a first polarizer and a first retardation plate which is disposed between the first polarizer and the liquid crystal layer and imparts a retardation of ¼ wavelength;
a second optical element disposed outside of the counter substrate and including a second circular polarization element including a second polarizer and a second retardation plate which is disposed between the second polarizer and the liquid crystal layer and imparts a retardation of ¼ wavelength;
a third retardation plate corresponding to an A-plate, which is disposed between the first circular polarization element and the liquid crystal layer and has a retardation in a plane thereof;
a fourth retardation plate corresponding to a C-plate, which is disposed between the first circular polarization element and the third retardation plate and has a retardation in a thickness direction thereof;
a fifth retardation plate corresponding to an A-plate, which is disposed between the second circular polarization element and the liquid crystal layer and has a retardation in a plane thereof; and
a sixth retardation plate corresponding to a C-plate, which is disposed between the second circular polarization element and the fifth retardation plate and has a retardation in a thickness direction thereof,
wherein each of the first optical element and the second optical element are configured to optically compensate a retardation of the liquid crystal layer in a predetermined display state in which a voltage is applied to the liquid crystal layer,
wherein each of the first retardation plate and the second retardation plate has wavelength dispersion characteristics which are the same for each red, green, and blue pixels, and such wavelength dispersion characteristics establish a relationship $\alpha1<1$ and $\alpha2>1$, where $\alpha1$ is a ratio of an in-plane retardation Re430 at a wavelength of 430 nm to an in-plane retardation Re550 at a wavelength of 550 nm, and wherein $\alpha2$ is a ratio of an in-plane retardation Re625 at a wavelength of 625 nm to the in-plane retardation Re550 at the wavelength of 550 nm; and
wherein a first rubbing direction of the first alignment film and a second rubbing direction of the second alignment film are set in a parallel direction as a reference direction, a first absorption axis of the first polarizer is 45° azimuth to the reference direction, a second absorption axis of the second polarizer is perpendicular to the first absorption axis, a slow axis of the first retardation plate is parallel to the reference direction, a slow axis of the second retardation plate is perpendicular to the reference direction, and a slow axis of the third retardation plate and a slow axis of the fifth retardation plate are perpendicular to the reference direction.

2. The liquid crystal display device according to claim 1, wherein the in-plane retardation Re550 of the first retardation plate is the same for each red, green, and blue pixels, and the in-plane retardation Re550 of the second retardation plate is the same for each red, green, and blue pixels.

3. The liquid crystal display device according to claim 1, wherein the first optical element and the second optical element are configured to be symmetric with respect to the liquid crystal display panel.

* * * * *